Figure 1:
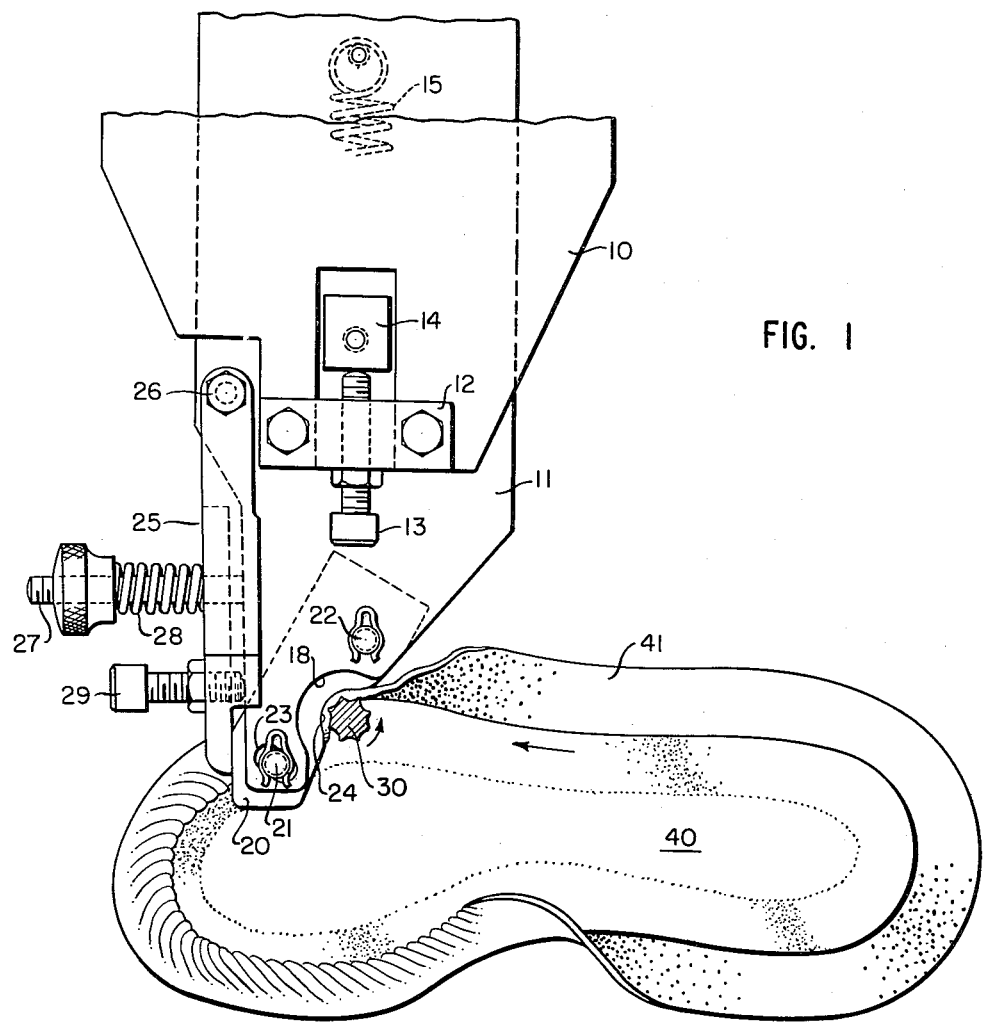

Oct. 31, 1961 W. W. PRUE 3,006,004
UPPER AND COVER LASTING MACHINE
Filed Oct. 28, 1960 3 Sheets-Sheet 1

INVENTOR.
WALTER W. PRUE

Oct. 31, 1961 W. W. PRUE 3,006,004
UPPER AND COVER LASTING MACHINE
Filed Oct. 28, 1960 3 Sheets-Sheet 3

INVENTOR.
WALTER W. PRUE
BY ial with respect to the insole or unduly to stretch and wrinkle it and on the other hand a substantially vertical tensioning draft is essential in the production of good work. Both these components of draft are supplied by the present machine and in such a manner as to eliminate the necessity for a driven wiper in addition to the block and rotary tool herein disclosed.

3,006,004
UPPER AND COVER LASTING MACHINE
Walter W. Prue, 331 Minot Ave., Auburn, Maine
Filed Oct. 28, 1960, Ser. No. 65,770
10 Claims. (Cl. 12—24.5)

This invention comprises a new and improved machine for lasting the upper of a shoe on its last, or performing similar shoe making operations such as lasting, tensioning or drawing in the upper or a binding strip about a platform sole, or applying a cover of upper leather or the like to an insole of any description.

The machine of my invention is characterized by the combination of a stationary but adjustable member recessed to present a concave surface which cooperates with a rotary tool to exert both vertical or substantially vertical tensioning draft and a longitudinal or horizontal feeding draft on the cover or lasting stock introduced between the two. I have discovered that exceptionally fine work may be realized without requiring any particular skill on the part of the operator if these vertical and horizontal or longitudinal drafts are nicely balanced to suit the character of the different materials with which the machine is required to deal. In one aspect therefore my invention comprises an elongated rotary tool, a cooperating block having a concave recess partially surrounding the tool in combination with means for relatively adjusting the block and tool to cause a desired degree of frictional engagement of the tool with interposed stock at any selected point of contact within the recess.

An important feature of the invention comprises a tool having flutes separated by pronounced valleys that extend without interruption throughout the portion of the tool rotating within the recess of the block. I have discovered that in using a tool of this character the upper or cover stock may be introduced at the working point of the machine without the necessity of initially separating the tool from the cooperating concave surface of the block. In machines of this general type as heretofore known it has been necessary to provide a treadle or hand lever with connections for that purpose. The present machine is simplified and its operation expedited by the novel combination above described.

Figure 2:
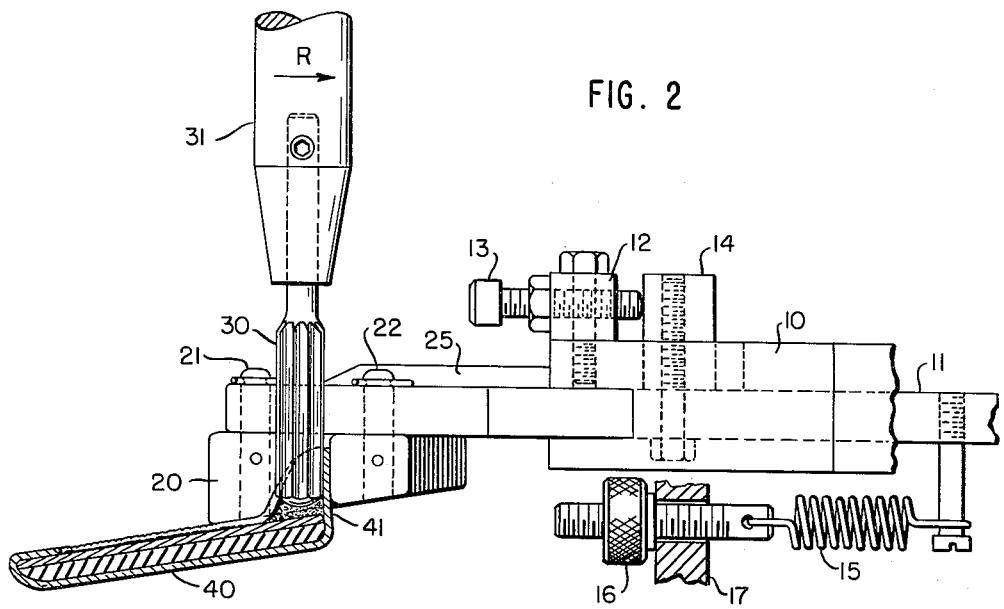
Figure 3:
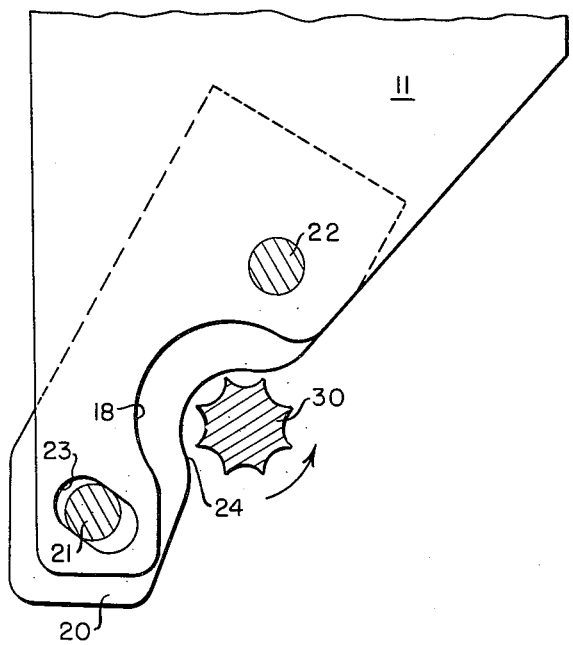
Figure 4:
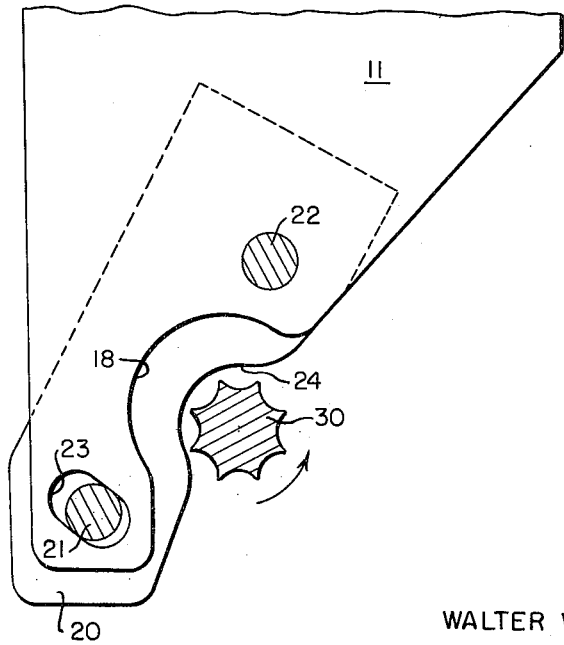

Other features of the invention relate to the shape and mounting of the block or member which provides the stationary element of the machine. This will be best understood and appreciated from the following description of a preferred embodiment thereof selected for purposes of illustration and shown in the accompanying drawings in which:

FIG. 1 is a plan view of the operating instrumentalities of the machine showing an insole in process, FIG. 2 is a corresponding view in side elevation, and FIGS. 3 and 4 are diagrammatic views on an enlarged scale showing the block and rotary tool in two positions of relative adjustment.

In the drawings only sufficient portions of the frame appear as are required to support the operating elements of the machine. The frame includes a stationary slotted bracket 10 in which are formed horizontal ways for a slide 11. A stationary block 12 is bolted to the frame member 10 and provided with an adjusting screw 13. This cooperates with a lug 14 secured to the slide 11 and projecting upwardly through a slot in the forward end of the frame member. A tension spring 15 is secured at its rear end to a pin projecting downwardly from the slide 11 and at its forward end to an adjusting screw 16 threaded into another portion 17 of the frame. It will be apparent therefore that the spring 15 serves to maintain the slide 11 in a position of predetermined adjustment determined by the setting of the screw 13 while permitting the slide to yield rearwardly to accommodate variations in the thickness of the upper or cover stock as will presently appear.

The slide 11 is tapered from one side at its forward end having an inclined edge wall with a semi-circular cutout 18 providing ample clearance for the operating elements of the machine.

The stationary element of the machine comprises a block 20 substantially rectangular in contour and having an under face which is inclined upwardly and rearwardly at an angle of approximately 10°. This exposed face is of sufficient area to engage and determine the angular position of the insole or other shoe part that may be presented to the machine. The block is secured to the under side of the slide 11 by a pair of upstanding studs 21 and 22. These studs pass upwardly through the slide 11 and are provided with removable retaining clips or cotter pins so that the block 20 may be readily detached and interchanged for other blocks of selected shape. The stud 21 passes upwardly through a slot 23 which permits pivotal movement of the block about the axis of the stud 22. The block 20 is provided at one edge with a reentrant concave recess 24 providing a semi-cylindrical vertically disposed friction surface. The block 20 may be formed of lignum vitae or other wood, or of Teflon or other synthetic resin selected in accordance with the desired coefficient of friction material.

The angular position of the block 20 about the axis of the stud 22 is determined by an arm 25 pivotally mounted upon the slide 11 by a vertical pin 26. The slide also carries a horizontal pin 27 surrounded by a compression spring 28 which biases the arm 25 in a counterclockwise direction, as seen in FIG. 1, under adjustable spring pressure. The arm carries a horizontal adjusting screw 29 which bears on the edge face of the slide 11 and so determines the position of the arm 25 and of the block 20 against which it bears. It will thus be apparent that while the block is held firmly and yieldingly in position it may yield longitudinally against the tension of the spring 15 and transversely against the tension of the spring 28.

The driven element of the machine comprises an elongated roll or spindle 30 which as best shown in FIGS. 3 and 4 is octagonal in cross section having ribs defined by pronounced depressions that extend without interruption to the lower end of the tool. The tool is mounted in a driven vertical shaft 31 which is rotated in counterclockwise direction through gearing and other connections by a motor not shown herein. The axis of the tool 30 passes vertically through the recess 24 of the block 20 and it may be assumed that as originally set up the tool is concentric with the semi-cylindrical friction surface of the recess. Under these conditions the rotary effect of the tool will be to impart to any interposed stock substantially equal forward or feeding draft and transverse or tensioning draft. It is these two effects that may be nicely and precisely balanced in the adjustment of the present machine. Excessive or unbalanced feeding draft is objectionable in that it tends to displace the cover material with respect to the insole or unduly to stretch and wrinkle it and on the other hand a substantially vertical tensioning draft is essential in the production of good work. Both these components of draft are supplied by the present machine and in such a manner as to eliminate the necessity for a driven wiper in addition to the block and rotary tool herein disclosed.

The possible adjustments of the machine are diagrammatically suggested in FIGS. 3 and 4. In FIG. 3 the block 20 is shown as adjusted forwardly so that the fluted periphery of the tool 30 rotates closely adjacent to the rear side of the recess 24 and is thus in position to exert maximum feeding draft with little or no transverse tensioning draft. In FIG. 4 the block 20 is shown as adjusted to bring the periphery of the tool 30 close to the forward portion of the recess 24, thus imparting to any interposed cover material tensioning draft with little or no feeding draft. Ideal conditions are produced by an intermediate adjustment of the block whereby the two draft components are balanced in accordance with the material and condition of the work.

In FIGS. 1 and 2 the machine is shown as operating upon an insole 40 which is having applied to it a cover 41 of upper leather or the like. The insole comes to the machine with the upper adhesively secured to one face and projecting outwardly beyond the edge of the insole herein shown as coated with activated or pressure sensitive cement. The projecting margin of the cover material may be introduced without any preparatory adjustment between the rotary tool 30 and the reentrant curved surface of the recess 24. The angular position of the insole is determined by the inclined lower face of the block 20 and so insures tensioning draft. The tool 30 is arranged so that its bottom end just clears the insole while a portion of the wall of the recess 24 extends over the face of the insole. The result is that the margin of the cover material is tensioned by upward draft, advanced by longitudinal draft and wiped in over the exposed face of the insole by pressure of the exposed face of the block 20.

It will be seen from FIG. 1 that the edge of the sole 40 is moved in a path that is substantially tangent to the pitch circle of the rotary tool 30 with the tool located over the body of the sole. The tool 30 therefore acts as an edge gauge by engaging the upturned margin of the cover and the operator easily detects by feeling the correct position of presentation of the work. It will also be noted that the present machine is highly simplified as compared to earlier machines of this type in that it requires no driven wiper, and no separate edge gauge or height gauge.

Having thus disclosed my invention and described in detail an illustrative embodiment thereof, I claim as new and desire to secure by Letters Patent:

1. A cover lasting machine comprising a rotary octagonal and longitudinally fluted tool, a block having a cooperating recess with a reentrant curved wall partially surrounding the tool, and means for adjusting the block to cause a desired degree of frictional engagement of the tool with stock interposed between the tool and the wall of the block at different points of contact for exerting either transverse draft or longitudinal feeding movement to the stock.

2. A lasting machine comprising a block having an inclined under face of substantial area for positioning a sole and a curved reentrant recess in one edge, in combination with a tool rotatable about a vertical axis passing within said recess, and having longitudinal flutes that extend without interruption throughout that portion of the tool which rotates within said recess.

3. A lasting machine as described in claim 2, further characterized in that the block is provided with means for adjusting it in one direction with respect to the axis of the tool and other means for adjusting it in a direction at right angles thereto.

4. A lasting machine comprising a horizontally movable slide, a block pivotally mounted on the under side of said slide and having an exposed under surface of substantial area which is inclined with respect to said slide, the block having also a recess with a concave vertically disposed wall, in combination with a tool rotatable about a vertical axis passing through said recess.

5. A lasting machine comprising a frame carrying a horizontally movable slide, a block adjustably mounted on the lower face of the slide and having in one edge a concave recess which projects beyond the slide, in combination with a fluted tool rotatable about an axis passing through said recess.

6. A lasting machine as defined in claim 5, further characterized in that spring means are provided to act on the slide to bias it yieldingly at all times into a position of predetermined adjustment with respect to said rotary tool.

7. A lasting machine comprising a frame carrying a transversely movable slide, a block pivotally mounted beneath the slide and having a concave recess in one edge that is exposed beyond the contour of the slide, a movable arm adjustably mounted on the slide for determining the angular position of the block, and a tool mounted to rotate about an axis passing through said recess and in different adjusted positions therein.

8. A lasting machine comprising a frame, a slide mounted for horizontal movement therein, a spring acting to maintain the slide yieldingly in predetermined adjusted position in the frame, a block adjustably secured to the outer end of the slide and having a recessed edge which projects beyond the slide, adjustable means carried by the slide for determining the position of the block thereon, and a fluted tool rotatable about an axis passing through the recessed edge of the block.

9. In a lasting machine having a stationary member with a concave friction surface, a cooperating rotary tool, octagonal in cross section with deep longitudinal grooves that extend without interruption to the end of the tool.

10. A cover lasting machine comprising an adjustable but stationary block having an inclined under face serving as a height gauge for a sole and having also a reentrant recess presenting a semi-cylindrical friction surface, in combination with a fluted spindle rotatable about a vertical axis within and above the body of a sole positioned by said block thereby drafting the cover margin upwardly across the edge of the sole in position to be wiped inwardly by the under face of the block in the longitudinal feeding movement of the work.

References Cited in the file of this patent

UNITED STATES PATENTS 2,805,431    Schwabe _____ Sept. 10, 1957

FOREIGN PATENTS 836,154    Germany _____ Apr. 10, 1952